US012689970B2

(12) United States Patent
Barawkar et al.

(10) Patent No.: US 12,689,970 B2
(45) Date of Patent: Jul. 21, 2026

(54) SUBSCRIBER SERVICE VALIDATION USING SUCI CLEARTEXT

(71) Applicant: T-Mobile USA, Inc., Bellevue, WA (US)

(72) Inventors: Kunal Prakash Barawkar, Bothell, WA (US); Romil Kumar Sood, Bothell, WA (US); Suresh Thanneeru, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 287 days.

(21) Appl. No.: 18/399,366

(22) Filed: Dec. 28, 2023

(65) Prior Publication Data

US 2025/0220559 A1    Jul. 3, 2025

(51) Int. Cl.
H04W 48/02        (2009.01)
H04W 12/06        (2021.01)
(Continued)

(52) U.S. Cl.
CPC ........... H04W 48/02 (2013.01); H04W 12/06 (2013.01); H04W 12/72 (2021.01); H04W 12/73 (2021.01);
(Continued)

(58) Field of Classification Search
CPC ........... H04W 12/06; H04W 12/72–73; H04W 12/75; H04W 48/02; H04W 60/00; H04W 60/001; H04W 60/002; H04W 60/04
See application file for complete search history.

(56) References Cited

U.S. PATENT DOCUMENTS

2004/0152462 A1 *  8/2004  Hwang ................. H04W 48/18
                                                      455/552.1
2020/0267625 A1 *  8/2020  Deshmukh .............. H04W 8/04
                          (Continued)

FOREIGN PATENT DOCUMENTS

WO      2020065502 A1    4/2020
WO      2022237693 A1    11/2022
WO      2023217685 A1    11/2023

OTHER PUBLICATIONS

International Search Report and Written Opinion received in International Application No. PCT/US2024/059064, mailed on Mar. 20, 2025, 10 pages.

*Primary Examiner* — Kevin C. Harper
(74) *Attorney, Agent, or Firm* — Foley IP Law, PLLC

(57)        ABSTRACT

Subscriber service validation using subscription concealed identifier (SUCI) cleartext is disclosed. When a user equipment (UE) attempts to register with a wireless network, it sends its SUCI which has an encrypted subscription permanent identifier (SUPI), but also a routing indicator in cleartext (unencrypted). This is available to the base station. By formulating a list of routing indicators associated with roaming partners (along with its own routing indicator), the base station is able to identify UEs that should be approved for registration. This precludes the need for the access and mobility function (AMF) to involve the authentication server function (AUSF) and unified data management (UDM) in decrypting the SUPI for unauthorized UEs, thereby reducing network traffic. Identification of the public key, associated with the private key used to encrypt the SUPI, is also within the SUCI in cleartext, and so may be used in place of the routing indicator.

16 Claims, 7 Drawing Sheets

(51) Int. Cl.
| | |
|---|---|
| *H04W 12/72* | (2021.01) |
| *H04W 12/73* | (2021.01) |
| *H04W 12/75* | (2021.01) |
| *H04W 60/00* | (2009.01) |
| *H04W 60/04* | (2009.01) |

(52) U.S. Cl.
CPC ........... *H04W 12/75* (2021.01); *H04W 60/00* (2013.01); *H04W 60/001* (2025.08); *H04W 60/04* (2013.01)

(56) References Cited

U.S. PATENT DOCUMENTS

| | | | |
|---|---|---|---|
| 2021/0368345 A1* | 11/2021 | Nakarmi | ............... H04L 9/0825 |
| 2022/0060325 A1* | 2/2022 | Castellanos Zamora | .................... H04W 12/40 |
| 2022/0272621 A1* | 8/2022 | Takakura | ................ H04W 8/22 |
| 2024/0292219 A1* | 8/2024 | Kim | ................... H04W 12/037 |
| 2025/0063354 A1* | 2/2025 | Khare | ................... H04W 12/06 |

* cited by examiner

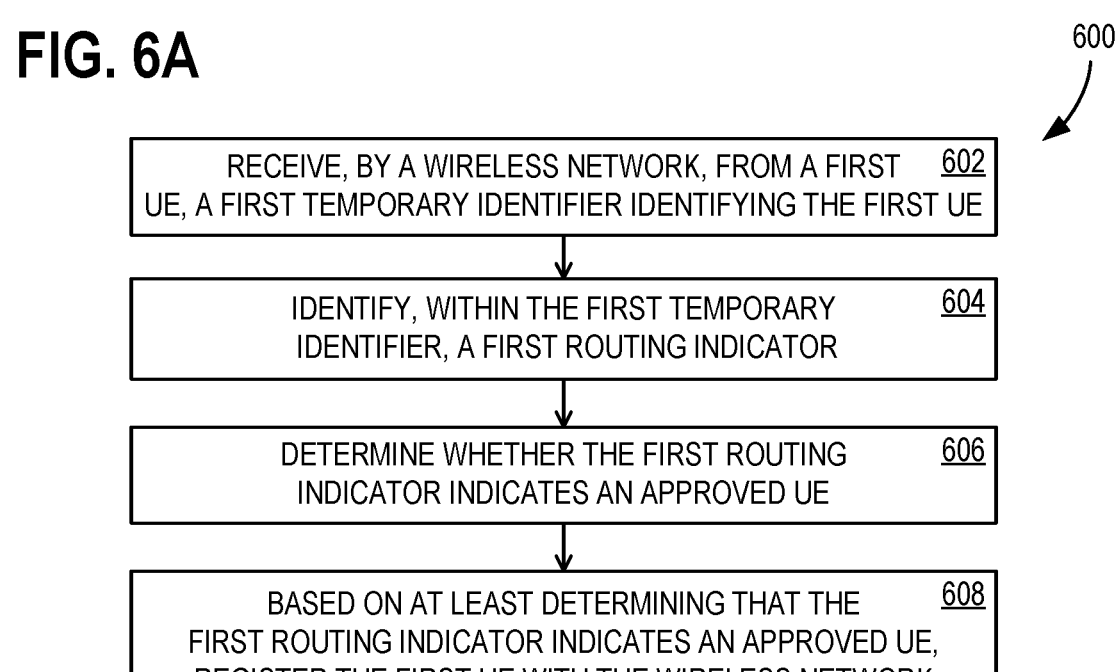

RECEIVE, BY A WIRELESS NETWORK, FROM A FIRST  602
UE, A FIRST TEMPORARY IDENTIFIER IDENTIFYING THE FIRST UE

↓

IDENTIFY, WITHIN THE FIRST TEMPORARY  604
IDENTIFIER, A FIRST ROUTING INDICATOR

↓

DETERMINE WHETHER THE FIRST ROUTING  606
INDICATOR INDICATES AN APPROVED UE

↓

BASED ON AT LEAST DETERMINING THAT THE  608
FIRST ROUTING INDICATOR INDICATES AN APPROVED UE,
REGISTER THE FIRST UE WITH THE WIRELESS NETWORK

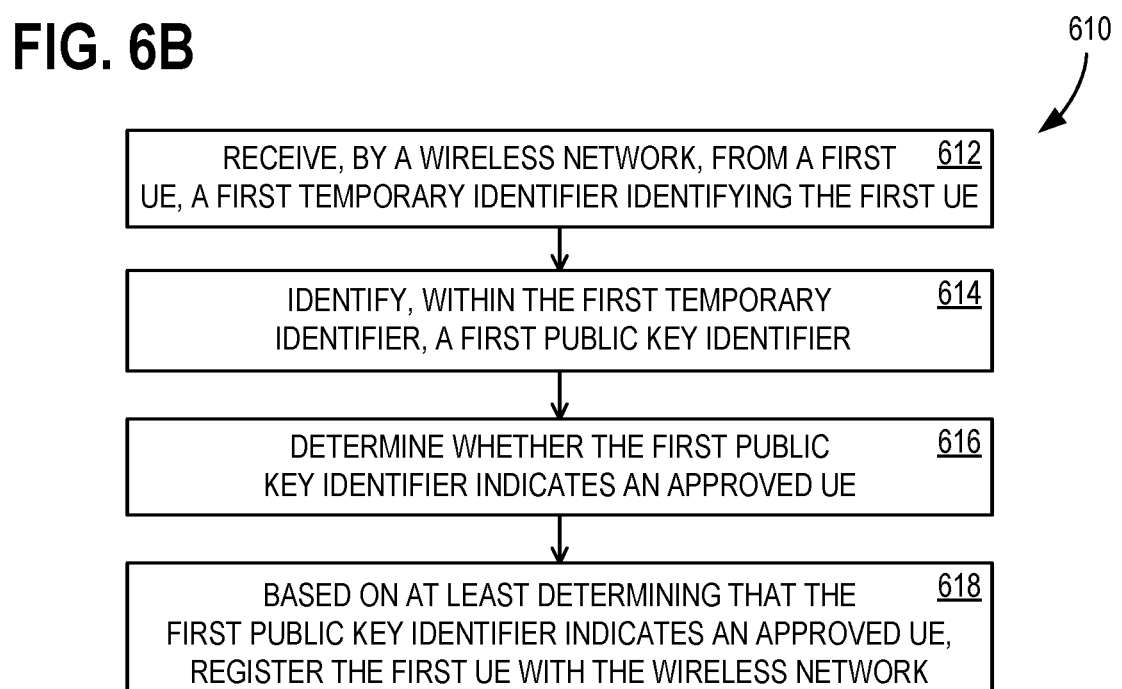

RECEIVE, BY A WIRELESS NETWORK, FROM A FIRST  612
UE, A FIRST TEMPORARY IDENTIFIER IDENTIFYING THE FIRST UE

↓

IDENTIFY, WITHIN THE FIRST TEMPORARY  614
IDENTIFIER, A FIRST PUBLIC KEY IDENTIFIER

↓

DETERMINE WHETHER THE FIRST PUBLIC  616
KEY IDENTIFIER INDICATES AN APPROVED UE

↓

BASED ON AT LEAST DETERMINING THAT THE  618
FIRST PUBLIC KEY IDENTIFIER INDICATES AN APPROVED UE,
REGISTER THE FIRST UE WITH THE WIRELESS NETWORK

SUBSCRIBER SERVICE VALIDATION USING SUCI CLEARTEXT

BACKGROUND

Each user equipment (UE) that is able to operate on a common wireless network, such as a cellular network, has a unique subscription permanent identifier (SUPI). When a UE attempts to register with a wireless network, it sends a temporary identifier, such as a subscription concealed identifier (SUCI). For security reasons, the SUPI is encrypted within the SUCI.

Using a fifth generation (5G) cellular network as an example, the base station receiving the SUCI forwards it to an access and mobility function (AMF), which involves an authentication server function (AUSF) and unified data management (UDM) to decrypt the SUPI, so that a determination may be made whether the UE attempting registration is authorized on the network. Unfortunately, this process burdens the network with excess traffic, because the AMF does not have the ability to decrypt the SUPI on its own.

SUMMARY

The following summary is provided to illustrate examples disclosed herein, but is not meant to limit all examples to any particular configuration or sequence of operations.

Disclosed examples of subscriber service validation using subscription concealed identifier (SUCI) cleartext include: receiving, by a wireless network, from a first UE, a first temporary identifier identifying the first UE; identifying, within the first temporary identifier, a first routing indicator; determining whether the first routing indicator indicates an approved UE; and based on at least determining that the first routing indicator indicates an approved UE, registering the first UE with the wireless network.

Additional examples include: receiving, by a wireless network, from a first UE, a first temporary identifier identifying the first UE; identifying, within the first temporary identifier, a first public key identifier; determining whether the first public key identifier indicates an approved UE; and based on at least determining that the first public key identifier indicates an approved UE, registering the first UE with the wireless network.

BRIEF DESCRIPTION OF THE DRAWINGS

The disclosed examples are described below with reference to the accompanying drawing figures listed below, wherein:

FIG. 1 illustrates an exemplary architecture that advantageously performs subscriber service validation using subscription concealed identifier (SUCI) cleartext;

FIGS. 6A and 6B illustrate additional flowcharts of exemplary operations associated with the architecture of FIG. 1.

Figure 2:
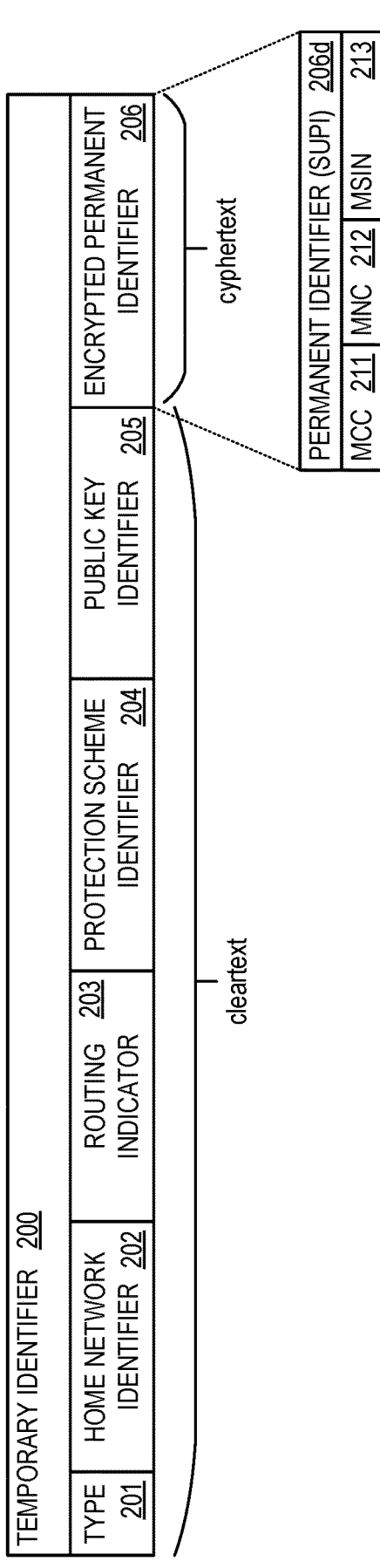
FIG. 2 illustrates an example SUCI, as may be used in examples of the architecture of FIG. 1.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Subscriber service validation using subscription concealed identifier (SUCI) cleartext is disclosed. When a user equipment (UE) attempts to register with a wireless network, it sends its SUCI which has an encrypted subscription permanent identifier (SUPI), but also a routing indicator in cleartext (unencrypted). This is available to the base station. By formulating a list of routing indicators associated with roaming partners (along with its own routing indicator), the base station is able to identify UEs that should be approved for registration.

This precludes the need for the access and mobility function (AMF) to involve the authentication server function (AUSF) and unified data management (UDM) in decrypting the SUPI prior to determining whether the UE is authorized, thereby reducing network traffic when unauthorized UEs attempt to register with the network. Identification of the public key, associated with the private key used to encrypt the SUPI, is also within the SUCI in cleartext, and so may be used in place of the routing indicator.

Aspects of the disclosure improve the throughput of cellular networks by reducing network traffic, such as traffic among an AMF, AUSF, and UDM that is associated with approving UEs to register with the network. This reduces the amount of network resources used, or allows more users to be served with a given level of resources. These advantageous results are enabled by at least determining whether a routing indicator (and/or other cleartext field of a temporary identifier such as a SUCI) indicates an approved UE.

Figure 1:
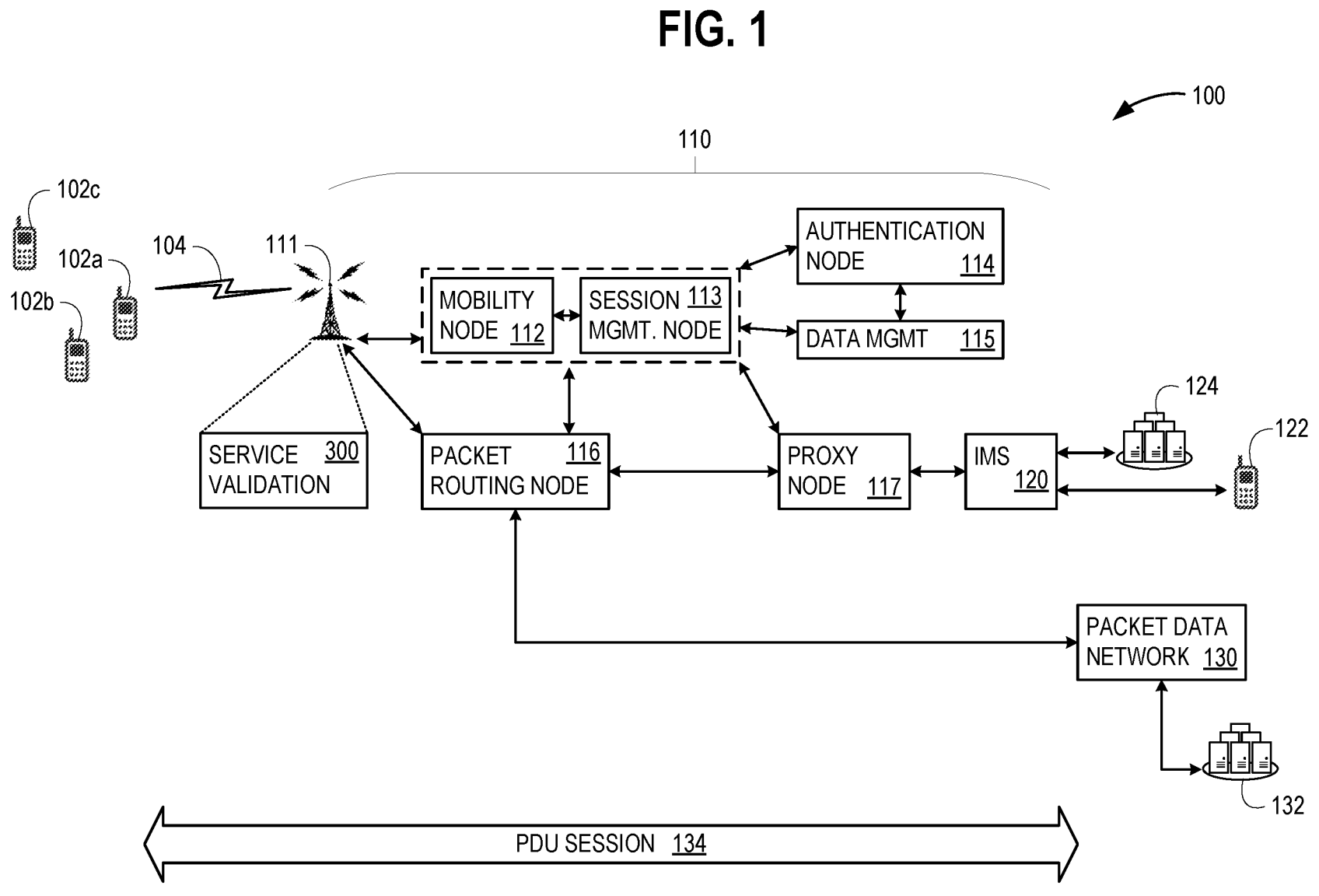

With reference now to the figures, FIG. 1 illustrates an exemplary architecture 100 that advantageously provides subscriber service validation using SUCI cleartext. In the scene depicted in FIG. 1, three UEs are attempting to register with wireless network 110: a UE 102a, a UE 102b, and a UE 102c. Each of UEs 102a-102c may be a cellular telephone, such as a smartphone, but may also represent other telecommunication devices capable of using a wireless network, such as a personal computer (PC, e.g., desktop, notebook, tablet, etc.) with a cellular modem.

Wireless network 110 may be a cellular network such as a fifth-generation cellular technology (5G) network, a fourth-generation cellular technology (4G) network, or another cellular generation network. In normal cellular operation, UE 102a uses an air interface 104 to communicate with a serving base station 111 of wireless network 110. UEs 102b and 102c each uses a similar air interface (not shown). In some scenarios, base station 111 may also be referred to as a radio access network (RAN). Wireless network 110 has a control plane that includes a mobility node 112, a session management node 113, an authentication node 114, and a data management node 115. Wireless network 110 also has a packet routing node 116, a proxy node 117, and an internet protocol (IP) multimedia subsystem (IMS) 120.

Base station 111 is in communication with mobility node 112 and packet routing node 116. Mobility node 112 is in communication with session management node 113. Session management node 113 is in communication with authentication node 114 and data management node 115. Packet routing node 116 is in communication with session management node 113, proxy node 117, and an external packet data network 130, such as the internet. Proxy node 117 is in communication with IMS 120, which provides connectivity to other wireless (cellular) networks or a public switched telephone system (POTS). In some examples, proxy node 117 may be considered to be within IMS 120.

UE 102a (which, as described below, is able to register with wireless network 110) reaches other telephones, such as another UE 122 via IMS 120, and also some media resources, such as a network resource 124. UE 102a reaches network resource 132 via packet data network 130. Data packets from UE 102a pass through at least base station 111 and packet routing node 116 on their way to external packet data network 130 or IMS 120 (via proxy node 117). When UE 102a is being served by wireless network 110, wireless network 110 hosts a protocol data unit (PDU) session 134 for UE 102a as a phone call to UE 122 or a data session with either network resource 124 or network resource 132.

In some 5G examples, base station 111 comprises a gNodeB (gNB), mobility node 112 comprises an access mobility function (AMF), session management node 113 comprises a session management function (SMF), authentication node 114 comprises an authentication server function (AUSF), data management node 115 comprises a unified data management (UDM), and packet routing node 116 comprises a user plane function (UPF). In some 4G examples, base station 111 comprises an eNodeB (eNB), mobility node 112 comprises a mobility management entity (MME), session management node 113 comprises a system architecture evolution gateway (SAEGW) control plane (SAEGW-C), and packet routing node 116 comprises an SAEGW-user plane (SAEGW-U). Also, in some 4G examples, authentication node 114 and data management node 115 are combined into a single home subscriber server (HSS). In some examples, proxy node 117 comprises a proxy call session control function (P-CSCF) in both 4G and 5G. In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

In legacy operation, each of UEs 102a-102c is authenticated by authentication node 114 and data management node 115 decrypting a SUPI and returning the results to mobility node 112. However, this results in wasted traffic when a UE fails authorization (i.e., is not approved to use wireless network 110). To reduce the likelihood of wasted authorization traffic, base station 111 has service validation logic 300 that performs subscriber service validation using one or more cleartext fields in a temporary identifier 200, which is shown in FIG. 2.

FIG. 2 illustrates an example temporary identifier 200, which may be a SUCI, although some examples may use an equivalent to a SUCI. Temporary identifier 200 is unique to a UE, and has several data fields. As illustrated, temporary identifier 200 has a type identifier 201 that identifies the type of temporary identifier 200, a home network identifier 202 of the UE that temporary identifier 200 identifies, a routing indicator 203 that is one to four decimal digits assigned by the UE's home network operator, a protection scheme identifier 204 that identifies the encryption scheme used to encrypt a permanent identifier 206, a public key identifier 205 that identifies the public key used to encrypt permanent identifier 206, and the encrypted permanent identifier 206 (i.e., permanent identifier 206 in cyphertext).

Type identifier 201, home network identifier 202, routing indicator 203, protection scheme identifier 204, and public key identifier 205, are all in cleartext. Routing indicator 203 and public key identifier 205 are unique to certain mobile network operators, whereas type identifier 201 and protection scheme identifier 204 are common among UEs from many different mobile network operators. Thus, routing indicator 203 and public key identifier 205 are suitable to provide cleartext identification of at least the mobile network to which a UE is a home subscriber.

In some examples, permanent identifier 206 is a SUPI, although some examples may use another temporary identifier, equivalent to a SUCI. A cleartext example of permanent identifier 206 is shown as decrypted permanent identifier 206d, which has a mobile country code (MCC) 211, a mobile network code (MNC) 212, and a mobile subscription identification number (MSIN) 213. MSIN 213 is a unique numeric code used to identify UE by its home network. The combination of MCC and MNC is unique, so permanent identifier 206 is unique to UE (at least in its decrypted or cleartext state). In some examples, permanent identifier 206 is encrypted using an elliptic curve integrated encryption scheme (ECIES), which will be specifically identified by protection scheme identifier 204. ECIES uses a key pair in which one key encrypts and another key decrypts. One key of the pair will be publicly distributed, and identified as the public key, whereas the other key is held in secrecy, and identified as the private key. Public key identifier 205 enables a node, such as data management node 115, which securely holds (or otherwise has access to) multiple private keys, to identify which private keys to use for decrypting encrypted permanent identifier 206.

Figure 3:
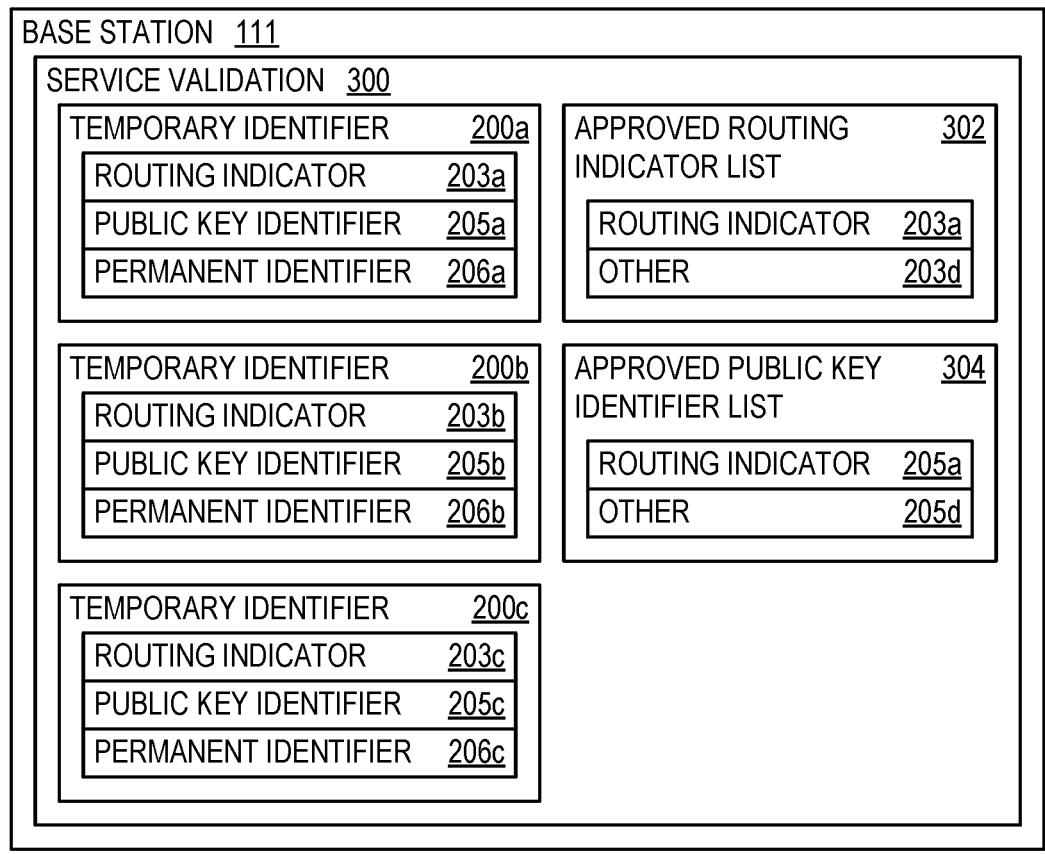
FIG. 3 illustrates an exemplary logic at the base station of the wireless network of FIG. 1, which performs subscriber service validation using SUCI cleartext for examples of the architecture of FIG. 1.

FIG. 3 illustrates an example of service validation logic 300 at base station 111. In some examples, service validation logic 300 may be distributed and located elsewhere in wireless network 110, such as at mobility node 112. In some examples, mobility node 112 has local provisioning per roaming partner public land mobile network (PLMN) to whitelist specific routing indicator(s).

Service validation logic 300 receives a temporary identifier 200 for each of the UEs that attempt to register with wireless network 110 via base station 111. As illustrated, there is a temporary identifier 200a for UE 102a, a temporary identifier 200b for UE 102b, and a temporary identifier 200c for UE 102c. Temporary identifier 200a has a routing indicator 203a, a public key identifier 205a, and a permanent identifier 206a (encrypted) for UE 102a. Temporary identifier 200b has a routing indicator 203b, a public key identifier 205b, and a permanent identifier 206b (encrypted) for UE 102b. Temporary identifier 200c has a routing indicator 203c, a public key identifier 205c, and a permanent identifier 206c (encrypted) for UE 102c.

Service validation logic 300 has a list 302 of approved UE routing indicators and/or a list 304 of approved UE public key identifiers. Lists 302 and 304 are compiled with the cooperation of routing partners of wireless network 110. The operator of wireless network 110 knows the routing indicators and public key identifiers assigned to its own subscribers' UEs, so these are added to the respective one of lists 302 and 304. This way, when one of the home subscriber UEs transmits its temporary identifier 200 to base station 111, the routing indicator and/or public key identifier may be located on list 302 and/or 304 without the need for decryption of the UE's permanent identifier 206.

The routing indicators and public key identifiers assigned to UEs of routing partners of wireless network 110 are also added to lists 302 and 304. When one of the UEs, that is a home subscriber to a routing partner of wireless network 110, transmits its temporary identifier 200 to base station 111, the routing indicator and/or public key identifier may be located on list 302 and/or 304 without the need for decryption of the UE's permanent identifier 206. For example, UE 102a is a home subscriber for wireless network 110, or a roaming partner of wireless network 110, so routing indicator 203a for UE 102a is within list 302 of approved UE routing indicators and public key identifier 205a for UE 102a is within list 304 of approved UE public key identifiers. List 302 also has at least one other routing indicator 203d, and list 304 also has at least one other public key identifier 205d, for other approved UEs.

Figure 4:
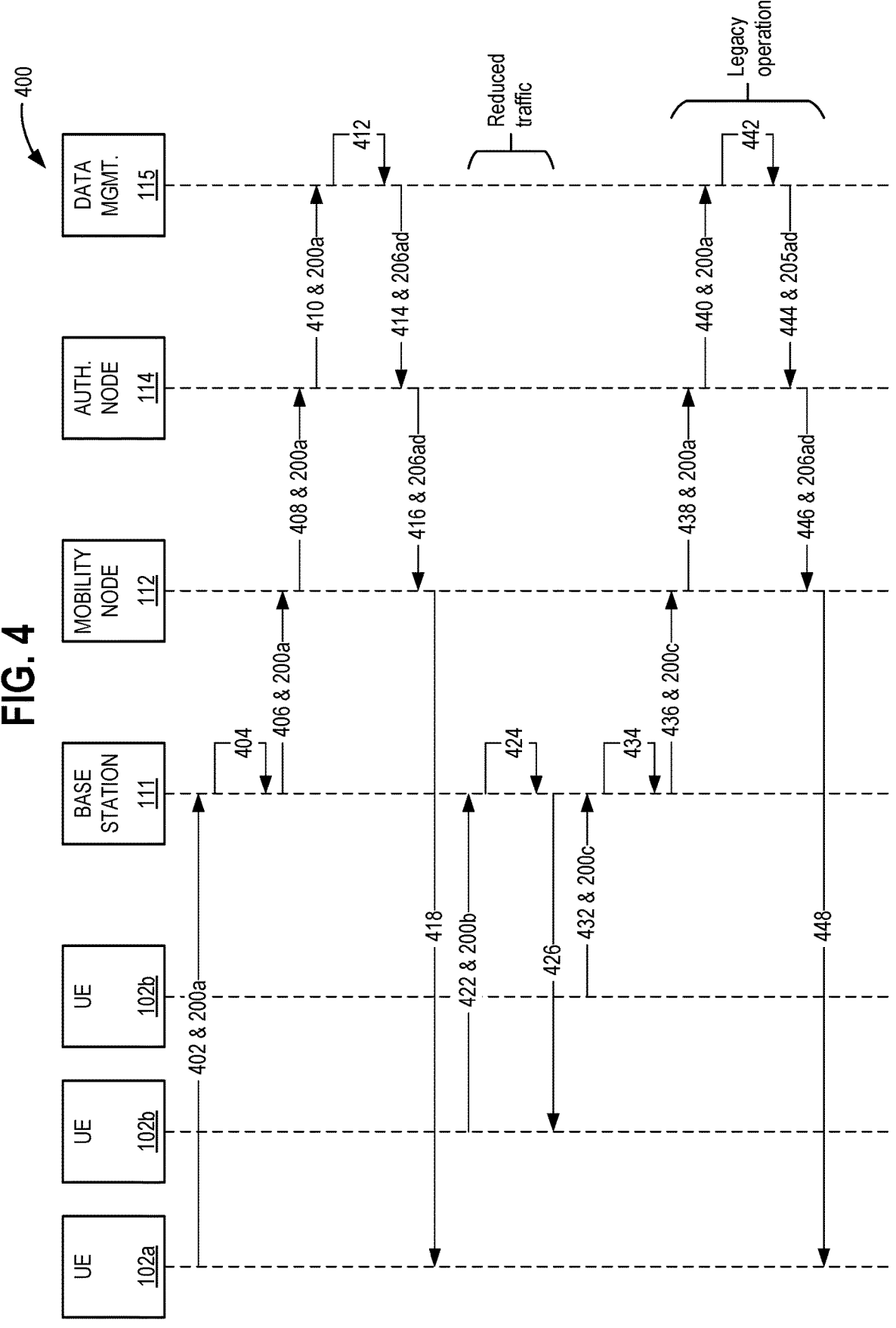
FIG. 4 illustrates an exemplary message sequence diagram for messages that may be used in examples of the architecture of FIG. 1.
Figure 5:
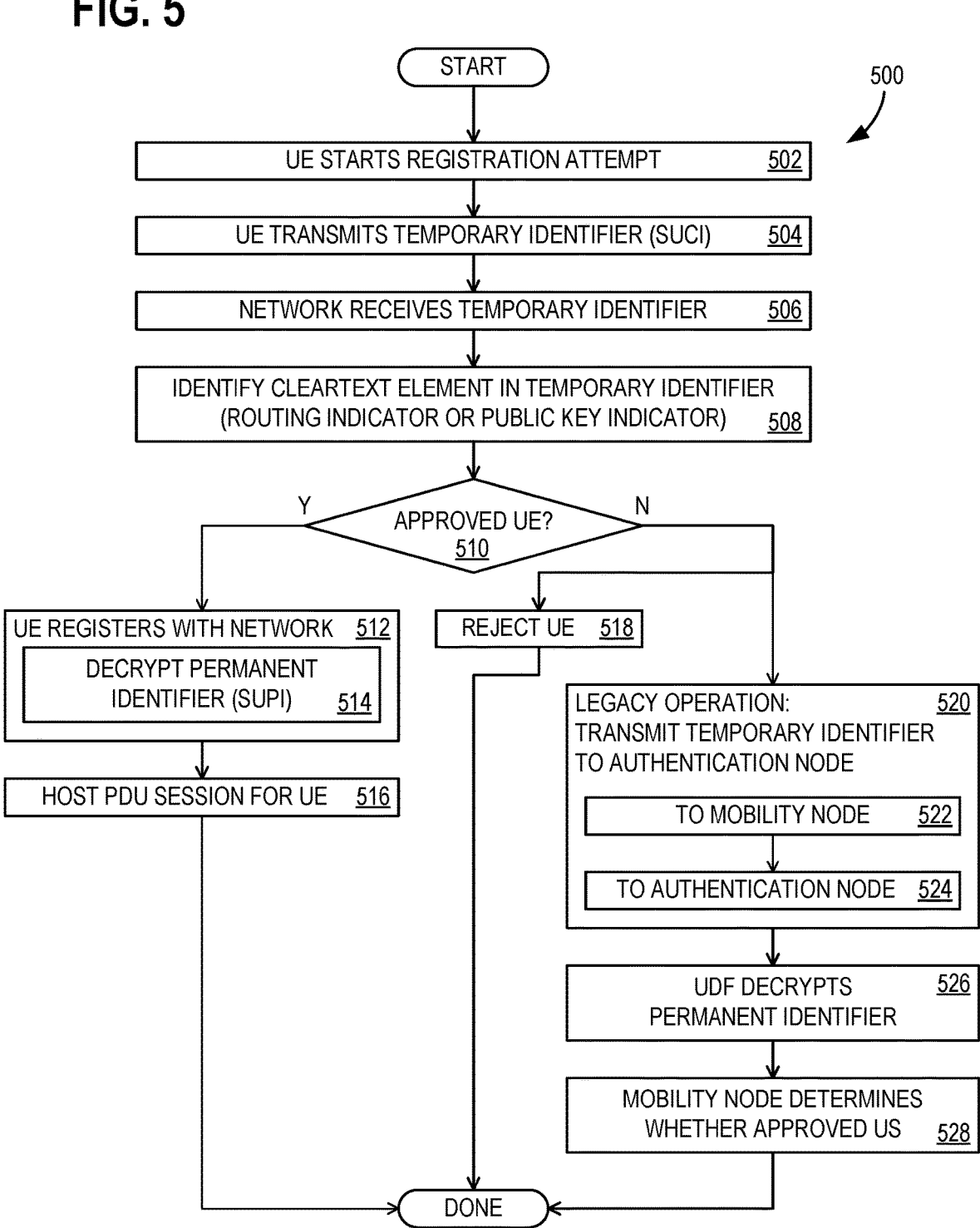
FIG. 5 illustrates a flowchart of exemplary operations associated with operation of the architecture of FIG. 1.

FIG. 4 illustrates an exemplary message sequence diagram 400 for messages that may be used in examples of architecture 100, and FIG. 5 illustrates a flowchart 500 of exemplary operations associated with architecture 100. In some examples, at least a portion of flowchart 500 may be performed using one or more computing devices 700 of FIG. 7. Message sequence diagram 400 and flowchart 500 are described together. Flowchart 500 will be described in three passes, one through each of its three branches. The first pass is operations 502-516.

Flowchart 500 commences with UE 102a starting a registration attempt with wireless network 110 in operation 502. UE 102a transmits temporary identifier 200a to wireless network 110 in operation 504, and wireless network 110 receives temporary identifier 200a identifying UE 102a in operation 506. This is shown as message 402 in message sequence diagram 400.

In operation 508, service validation logic 300 identifies routing indicator 203a and/or public key identifier 205a within temporary identifier 200a, and decision operation 510 determines whether routing indicator 203a indicates an approved UE. In some examples, this occurs within base station 111, and involves determining whether routing indicator 203a on list 302 of approved UE routing indicators and/or whether public key identifier 205a for UE 102a is within list 304 of approved UE public key identifiers. This is also shown as message 404. Because UE 102a is a home subscriber for wireless network 110 (or a roaming partner), routing indicator 203a is within list 302 and public key identifier 205a is within list 304. UE 102a is approved, and decision operation 510 takes the YES branch to operation 512.

Based on at least determining that routing indicator 203a indicates an approved UE, wireless network permits UE 102a to register, in operation 512. In some examples, this includes decrypting permanent identifier 206a for UE 102a in operation 514. This is shown as a series of messages carrying temporary identifier 200a to data management node 115: message 406 from base station 111 to mobility node 112, message 408 from mobility node 112 to authorization node 114, and message 410 from authorization node 114 to data management node 115. Data management node 115 decrypts permanent identifier 206a to decrypted permanent identifier 206ad, which is shown as message 412.

Decrypted permanent identifier 206ad is returned to mobility node 112 using message 414 to authorization node 114 and message 416 from authorization node 114 to mobility node 112. Mobility node 112 transmits a registration accept message 418 to UE 102a, and assigns another temporary identifier to UE 102a, such as a globally unique temporary identifier (GUTI). Based on at least registering UE 102a, wireless network 110 hosts PDU session 134 for UE 102a, which carries data traffic for UE 102a, in operation 516.

The next pass to describe is operations 502-510 and 518. Flowchart 500 commences with UE 102b starting a registration attempt with wireless network 110 in operation 502. UE 102b transmits temporary identifier 200b to wireless network 110 in operation 504, and wireless network 110 receives temporary identifier 200b identifying UE 102b in operation 506. This is shown as message 422 in message sequence diagram 400.

In operation 508, service validation logic 300 identifies routing indicator 203b and/or public key identifier 205b within temporary identifier 200b, and decision operation 510 determines whether routing indicator 203b indicates an approved UE. In some examples, this involves determining whether routing indicator 203b on list 302 of approved UE routing indicators and/or whether public key identifier 205b is within list 304 of approved UE public key identifiers. This is also shown as message 424. In this example, routing indicator 203b is not on list 302, and public key identifier 205b is not within list 304, so decision operation 510 takes the NO branch to operation 518.

In this example, decision operation 510 provides the final registration determination, and UE 102b is prohibited from registering with wireless network 110. The data traffic for decrypting permanent identifier 206b is avoided, reducing traffic on wireless network 110.

Some examples, however, have a different operation when the cleartext field used by service validation logic 300 is not found on one of its approved UE lists. This is shown in the third pass, through operations 502-510 and 520-528. Flowchart 500 commences with UE 102c starting a registration attempt with wireless network 110 in operation 502. UE 102c transmits temporary identifier 200c to wireless network 110 in operation 504, and wireless network 110 receives temporary identifier 200c identifying UE 102c in operation 506. This is shown as message 432 in message sequence diagram 400.

In operation 508, service validation logic 300 identifies routing indicator 203c and/or public key identifier 205c within temporary identifier 200c, and decision operation 510 determines whether routing indicator 203c indicates an approved UE. In some examples, this involves determining whether routing indicator 203c on list 302 of approved UE routing indicators and/or whether public key identifier 205c is within list 304 of approved UE public key identifiers. This is also shown as message 434. In this example, routing indicator 203c is not on list 302, and public key identifier 205c is not within list 304, so decision operation 510 takes the NO branch to operation 520.

Operations 520-528 are legacy authorization operations. In some examples, mobility node 112 comprises a security anchor function (SEAF) that acts as a liaison between a UE and its home network. It can reject an authentication from the UE, but it relies on the UE's home network to accept the authentication. In operation 520, mobility node 112 transmits temporary identifier 200c to authentication node 114 to decrypt permanent identifier 206c. This is shown as a series of messages carrying temporary identifier 200c to data management node 115: base station 111 transmits temporary identifier 200*c* to mobility node 112 with message 436 in operation 522, mobility node 112 transmits temporary identifier 200*c* to authorization node 114 with message 438 in operation 524, message 440 takes temporary identifier 200*c* from authorization node 114 to data management node 115. Data management node 115 decrypts permanent identifier 206*c* to decrypted permanent identifier 206*cd*, which is shown as message 442 and operation 526. Decrypted permanent identifier 206*ad* is returned to mobility node 112 using message 444 to authorization node 114 and message 446 from authorization node 114 to mobility node 112. Mobility node 112 uses decrypted permanent identifier 206*cd* to determine whether to permit registration of UE 102*c* with wireless network 110 in operation 528. Mobility node 112 then sends either a reject or accept message 448 to UE 102*c*.

FIG. 6A illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes receiving, by a wireless network, from a first UE, a first temporary identifier identifying the first UE.

Operation 604 includes identifying, within the first temporary identifier, a first routing indicator. Operation 606 includes determining whether the first routing indicator indicates an approved UE. Operation 608 includes, based on at least determining that the first routing indicator indicates an approved UE, registering the first UE with the wireless network.

FIG. 6B illustrates a flowchart 610 of exemplary operations associated with examples of architecture 100. In some examples, at least a portion of flowchart 610 may be performed using one or more computing devices 700 of FIG. 7. Flowchart 610 commences with operation 612, which includes receiving, by a wireless network, from a first UE, a first temporary identifier identifying the first UE.

Operation 614 includes identifying, within the first temporary identifier, a first public key identifier. Operation 616 includes determining that the first public key identifier indicates an approved UE. Operation 618 includes, based on at least determining that the first public key identifier indicates an approved UE, registering the first UE with the wireless network.

Figure 7:
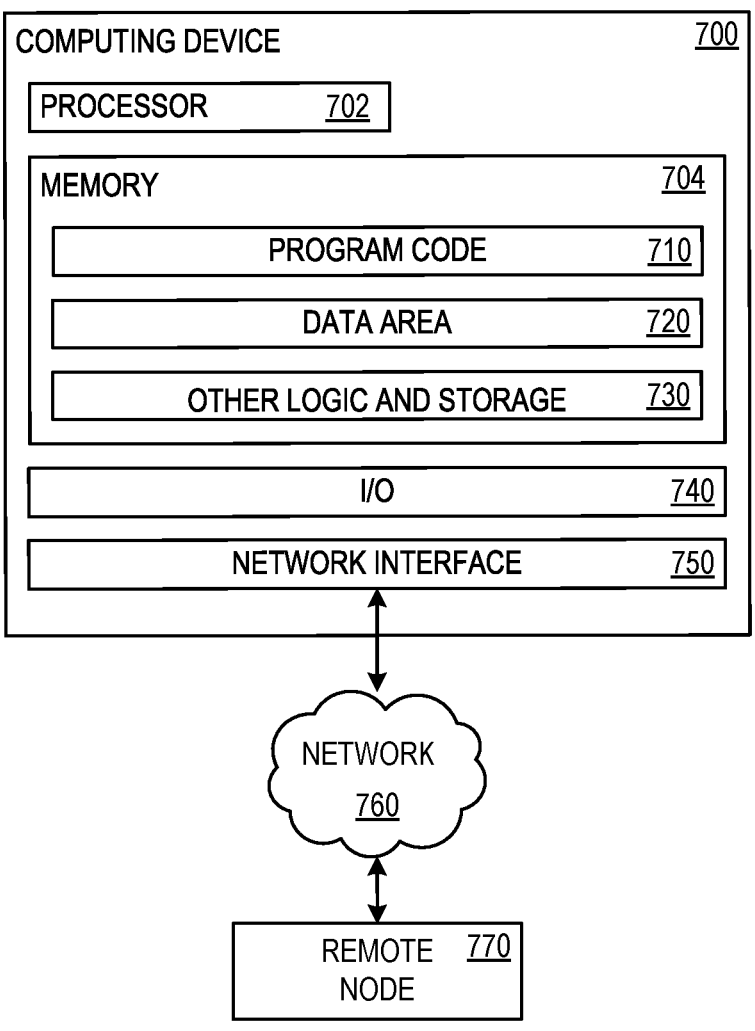
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external nal network 760 with a remote node 770, which may represent another implementation of computing device 700. For example, a remote node 770 may represent another of the above-noted nodes within architecture 100.

ADDITIONAL EXAMPLES

An example system comprises: a processor; and a computer-readable medium storing instructions that are operative upon execution by the processor to: receive, by a wireless network, from a first UE, a first temporary identifier identifying the first UE; identify, within the first temporary identifier, a first routing indicator; determine whether the first routing indicator indicates an approved UE; and based on at least determining that the first routing indicator indicates an approved UE, register the first UE with the wireless network.

An example method of wireless communication comprises: receiving, by a wireless network, from a first UE, a first temporary identifier identifying the first UE; identifying, within the first temporary identifier, a first routing indicator; determining whether the first routing indicator indicates an approved UE; and based on at least determining that the first routing indicator indicates an approved UE, registering the first UE with the wireless network.

One or more example computer storage devices has computer-executable instructions stored thereon, which, upon execution by a computer, cause the computer to perform operations comprising: receiving, by a wireless network, from a first UE, a first temporary identifier identifying the first UE; identifying, within the first temporary identifier, a first routing indicator; determining whether the first routing indicator indicates an approved UE; and based on at least determining that the first routing indicator indicates an approved UE, registering the first UE with the wireless network.

Another example system comprises: a processor; and a computer-readable medium storing instructions that are operative upon execution by the processor to: receive, by a wireless network, from a first UE, a first temporary identifier identifying the first UE; identify, within the first temporary identifier, a first public key identifier; determine whether the first public key identifier indicates an approved UE; and based on at least determining that the first public key identifier indicates an approved UE, register the first UE with the wireless network.

Another example method of wireless communication comprises: receiving, by a wireless network, from a first UE, a first temporary identifier identifying the first UE; identifying, within the first temporary identifier, a first public key identifier; determining whether the first public key identifier indicates an approved UE; and based on at least determining that the first public key identifier indicates an approved UE, registering the first UE with the wireless network.

One or more additional example computer storage devices has computer-executable instructions stored thereon, which, upon execution by a computer, cause the computer to perform operations comprising: receiving, by a wireless network, from a first UE, a first temporary identifier identifying the first UE; identifying, within the first temporary identifier, a first public key identifier; determining whether the first public key identifier indicates an approved UE; and based on at least determining that the first public key identifier indicates an approved UE, registering the first UE with the wireless network.

Alternatively, or in addition to the other examples described herein, examples include any combination of the following:

registering the first UE with the wireless network comprises decrypting the SUPI;

receiving, by the wireless network, from a second UE, a second temporary identifier identifying the second UE;

identifying, within the second temporary identifier, a second routing indicator;

determining whether the second routing indicator indicates an approved UE;

based on at least determining that the second routing indicator does not indicate an approved UE, rejecting registration of the second UE with the wireless network;

receiving, by the wireless network, from a third UE, a third temporary identifier identifying the third UE;

identifying, within the third temporary identifier, a third routing indicator;

determining whether the third routing indicator indicates an approved UE; and based on at least determining that the third routing indicator does not indicate an approved UE, transmitting the third temporary identifier to an authentication node of the wireless network;

decrypting a permanent identifier within the third temporary identifier;

based on at least the permanent identifier, determining whether to permit registration of the third UE with the wireless network;

based on at least registering the first UE with the wireless network, hosting a PDU session for the first UE;

the first temporary identifier comprises a SUCI;

a base station of the wireless network determines whether the first routing indicator indicates an approved UE;

determining that the first routing indicator indicates an approved UE comprises identifying the first routing indicator on a list of approved UE routing indicators;

the second temporary identifier comprises a SUCI;

the third temporary identifier comprises a SUCI;

the permanent identifier comprises a SUPI;

transmitting, by the first UE, the first temporary identifier to the wireless network;

transmitting, by the second UE, the second temporary identifier to the wireless network;

transmitting, by the third UE, the third temporary identifier to the wireless network;

transmitting the third temporary identifier to an authentication node of the wireless network comprises transmitting, by the base station, the third temporary identifier to a mobility node of the wireless network, wherein the mobility node further transmits the third temporary identifier to the authentication node;

the authentication node comprises an AUSF;

the mobility node comprises an AMF;

the AMF comprises an SEAF;

the mobility node determines whether to permit registration of the third UE with the wireless network based on at least the permanent identifier;

transmitting the third temporary identifier to the mobility node comprises transmitting the third temporary identifier to the SEAF;

a UDM of the wireless network decrypts the SUPI;

the base station comprises a gNB;

determining, at the base station, whether the second routing indicator indicates an approved UE and whether the third routing indicator indicates an approved UE;

the PDU session carries data traffic for the first UE;

substituting public key identifier for routing indicator in any of the claims;

receiving, by a wireless network, from a first UE, a first temporary identifier identifying the first UE; identifying, within the first temporary identifier, a first public key identifier; determining that the first public key identifier indicates an approved UE; and based on at least determining that the first public key identifier indicates an approved UE, registering the first UE with the wireless network; and determining that the first public key identifier indicates an approved UE comprises identifying the first routing indicator on a list of approved UE public key identifiers.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

receiving, by a cellular base station in a wireless network, a subscription concealed identifier (SUCI) from a user equipment (UE), the SUCI including an encrypted subscription permanent identifier (SUPI) and a routing indicator;

determining, by the cellular base station, that the routing indicator is on a list of approved UE routing indicators; and registering the UE with the wireless network, without decrypting the encrypted SUPI, based on the routing indicator being on the list of approved UE routing indicators.

2. The method of claim 1, further comprising:

based on at least registering the UE with the wireless network, hosting a protocol data unit (PDU) session for the UE.

3. A system comprising:

a processor; and a computer-readable medium storing programming instructions for execution by the processor, the programming instructions, upon execution by the processor, causing the system to perform the following operations:

receiving, by a cellular base station in a wireless network, a subscription concealed identifier (SUCI) from a user equipment (UE), the SUCI including an encrypted subscription permanent identifier (SUPI) and a routing indicator;

determining, by the cellular base station, that the routing indicator is on a list of approved UE routing indicators; and registering the UE with the wireless network, without decrypting the encrypted SUPI, based on the routing indicator being on the list of approved UE routing indicators.

4. The system of claim 3, wherein the programming instructions further cause the system to perform the following operations:

based on at least registering the UE with the wireless network, host a protocol data unit (PDU) session for the UE.

5. One or more computer storage devices having programming instructions stored thereon, which, upon execution by a processor of a system computer, cause the system to perform the following operations:

receiving, by a cellular base station in a wireless network, a subscription concealed identifier (SUCI) from a user equipment (UE), the SUCI including an encrypted subscription permanent identifier (SUPI) and a routing indicator;

determining, by the cellular base station, that the routing indicator is on a list of approved UE routing indicators; and registering the UE with the wireless network, without decrypting the encrypted SUPI, based on the routing indicator being on the list of approved UE routing indicators.

6. The one or more computer storage devices of claim 5, wherein the programming instructions further cause the system to perform the following operations:

based on at least registering the UE with the wireless network, hosting a protocol data unit (PDU) session for the UE.

7. The method of claim 1, wherein the UE is registered with the wireless network without forwarding the encrypted SUPI to a unified data management (UDM) of the wireless network.

8. The method of claim 1, wherein the UE is registered with the wireless network without forwarding the encrypted SUPI to an authentication server function (AUSF) of the wireless network.

9. The method of claim 1, wherein the UE is registered with the wireless network without forwarding the encrypted SUPI to a mobility device of the wireless network.

10. The method of claim 1, wherein the UE is registered with the wireless network without forwarding the encrypted SUPI to an access and mobility function (AMF) of the wireless network.

11. The method of claim 1, wherein the UE is registered with the wireless network without forwarding the SUCI to a unified data management (UDM) of the wireless network.

12. The method of claim 1, wherein the UE is registered with the wireless network without forwarding the SUCI to an authentication server function (AUSF) of the wireless network.

13. The method of claim 1, wherein the UE is registered with the wireless network without forwarding the SUCI to a mobility device of the wireless network.

14. The method of claim 1, wherein the UE is registered with the wireless network without forwarding the SUCI to an access and mobility function (AMF) of the wireless network.

15. The method of claim 1, wherein the list of approved UE routing indicators include routing indicators assigned to home subscriber UEs of the wireless network.

16. The method of claim 15, wherein the list of approved UE routing indicators further includes routing indicators assigned to roaming partner UEs of the wireless network.

* * * * *